No. 841,755. PATENTED JAN. 22, 1907.
T. A. WILLSON.
SPECTACLE TEMPLE.
APPLICATION FILED JAN. 11, 1906.
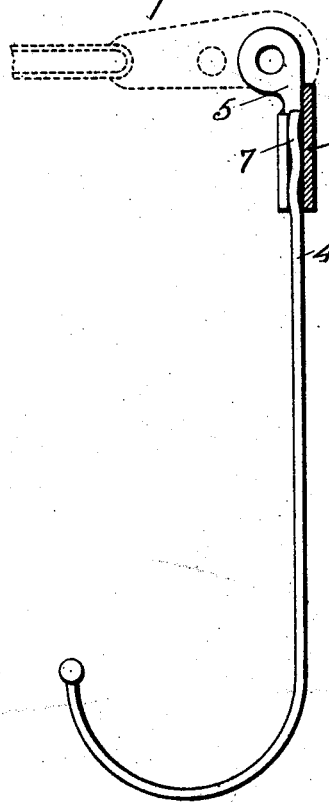
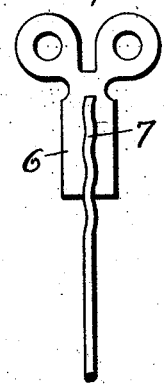
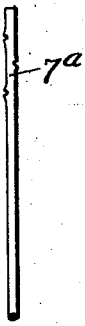
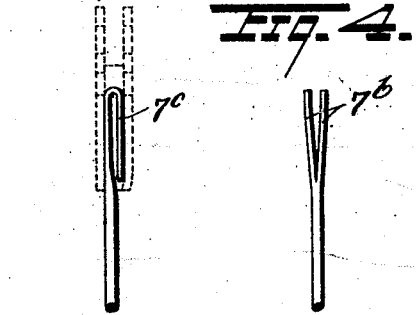
Thomas A. Willson,
Inventor

UNITED STATES PATENT OFFICE.

THOMAS A. WILLSON, OF READING, PENNSYLVANIA.

SPECTACLE-TEMPLE.

No. 841,755.  Specification of Letters Patent.  Patented Jan. 22, 1907.

Application filed January 11, 1906. Serial No. 295,526.

*To all whom it may concern:*

Be it known that I, THOMAS A. WILLSON, a citizen of the United States, and a resident of Reading, county of Berks, State of Pennsylvania, have invented certain new and useful Improvements in Spectacle-Temples, of which the following is a specification.

My invention relates to two-part spectacle-temples of the class shown in Patent No. 536,248, issued to me March 26, 1895, in which a sheet-metal pivot-piece formed separately from the temple wire or shaft is secured to the latter by folding and clamping the shank portion thereof upon an end portion of said shaft.

Owing to the resiliency of the metal in the clamping-shank of the pivot-piece, it has been found that there is great liability of the clamped connection to the temple-shaft becoming loosened when the finished spectacle is subjected to the strains incident to actual use, and more especially so when the temple-shaft is formed of round wire, as is commonly the case. This liability of failure of the clamped connection of the temple parts is practically a serious matter, and in a pending applicaton, Serial No. 248,415, I have provided for avoiding the necessity of effecting a rigid clamping of the parts by projecting the shaft through the shank portion of the pivot-piece and so shaping such projected portion as to thereby retain the temple parts in proper relation to the connected temple-joint ends of the spectacles independently of the clamping together of the parts.

In my present invention I provide for remedying the difficulty by specially forming that portion of the temple-shaft which is engaged by the clamping shank of the pivot-piece so that the clamping operation will insure a rigid connection of the parts notwithstanding the spring of the metal in the clamping-shank and the consequent impracticability of securing a firm grip upon a normally-formed portion of the temple-wire.

The invention is fully described in connection with the accompanying drawings and is specifically pointed out in the claims.

Figure 1 is an enlarged partly sectional elevation of a two-part temple embodying my invention, the temple-joint end of a connected spectacle-frame being indicated in dotted lines. Fig. 2 shows the specially-formed end portion of the temple-shaft or wire illustrated in Fig. 1 as it appears before being compressed by the clamping shank of the pivot-piece, which is also indicated. Figs. 3 to 5 illustrate several modifications embodying the essential features of my invention.

My improved temple is made up, as in my prior patent referred to, of two parts—namely, the wire shaft 4 and the sheet-metal pivot-piece 5—and the invention consists in so changing the form of the clamped portion of the shaft-wire as to provide for readily securing a rigid clamping engagement of the parts notwithstanding the elasticity of the clamping metal and the loosening of the grip upon the shaft after the clamping pressure is removed, which ordinarily occurs as already stated.

To provide for insuring this rigid connection between the clamping-shank 6 of the pivot-piece and the shaft end 7, which is inclosed by said shank, I subject the shaft end 7 to an operation whereby the original or normal form of the wire is changed at such portion to adapt it to the special purpose of securing a suitable gripping effect when tightly inclosed by the clamping-shank. This effect may be secured, for instance, by merely crinkling the end 7 of the wire, as indicated in Fig. 2, so that when straightened out by the clamping operation (as in Fig. 1) the resiliency of the wire metal will insure a rigid connection of the parts even after the clamping-pressure is removed. Instead of thus bending the wire into corrugations the metal may be displaced by forming transverse depressions, as indicated in Fig. 3, whereby the required gripping effect is secured.

Other obvious modifications embodying my invention are indicated in Figs. 4 and 5. Fig. 4 shows the wire split longitudinally to form a resilient fork-shaped end 7ᵇ. Fig. 5 shows an end 7ᶜ formed by doubling over the swaged wire.

Thus it will be seen that the essential feature of my invention—namely, the providing of a specially-formed end upon the temple-wire, whereby it will be adapted to effect a rigid connection when enfolded and compressed by the clamping-ears of the pivot-piece—may be variously employed, and I do not desire to unduly limit myself to the specific constructions indicated; but

What I claim is—

1. A spectacle-temple comprising a separately-formed sheet-metal pivot-piece having shaft-clamping ears, and a shaft having a resiliently-formed end portion inclosed by said clamping-ears, the resilience of the clamped shaft portion serving to secure a rigid connection between the parts.

2. A spectacle-temple comprising a separately-formed sheet-metal pivot-piece having shaft-clamping ears, and a shaft having a deflected end portion the bend of which is inclosed by said clamping-ears to insure the rigid clamping of the parts.

3. A spectacle-temple comprising a separately-formed sheet-metal pivot-piece having shaft-clamping ears, and a shaft having a corrugated end portion inclosed by said clamping-ears.

In testimony whereof I affix my signature in the presence of two witnesses.

THOMAS A. WILLSON.

Witnesses:
J. B. ESHLEMAN,
HIRAM E. STEINMETZ